United States Patent [19]

Salini

[11] Patent Number: 5,434,367

[45] Date of Patent: * Jul. 18, 1995

[54] MERCHANDISE DAMPER AND PROTECTOR FOR WEIGHING SCALES

[76] Inventor: Robert J. Salini, 1433 Buttons Ct., Oakley, Calif. 94561

[*] Notice: The portion of the term of this patent subsequent to Mar. 23, 2010 has been disclaimed.

[21] Appl. No.: 35,982

[22] Filed: Mar. 22, 1993

Related U.S. Application Data

[63] Continuation of Ser. No. 774,043, Oct. 7, 1991, Pat. No. 5,195,599, which is a continuation-in-part of Ser. No. 640,270, Jan. 11, 1991, abandoned.

[51] Int. Cl.$^6$ .................... G01G 21/10; G01G 21/22
[52] U.S. Cl. .................................. 177/189; 177/262
[58] Field of Search ........................ 177/189, 262

[56] References Cited

U.S. PATENT DOCUMENTS

| | | | |
|---|---|---|---|
| 4,132,228 | 1/1979 | Green | 128/33 |
| 4,526,247 | 7/1985 | EeNisse et al. | 177/189 |

*Primary Examiner*—Benjamin R. Fuller
*Assistant Examiner*—Randy W. Gibson
*Attorney, Agent, or Firm*—Schapp and Hatch

[57] ABSTRACT

What is disclosed is a merchandise damping and protecting cover for the platforms of weighing scales. In some embodiments of my invention the scale platform cover includes a core comprised of one or more bodies of resilient foam material, contained in a rugged, tear-resistant envelope, and adhesive members for adhering the envelope to a platform of a weighing scale. In some embodiments of my invention the scale platform cover is provided with a shallow pocket in its upper face such that a rim is defined around the outer edge of the scale platform cover which prevents small items of merchandise from rolling off the scale platform cover.

8 Claims, 4 Drawing Sheets

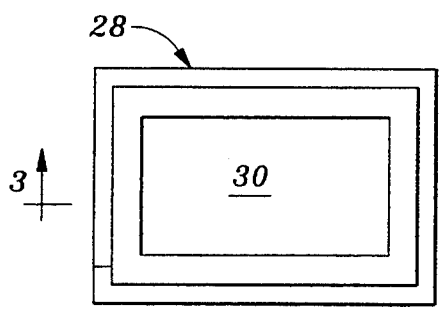
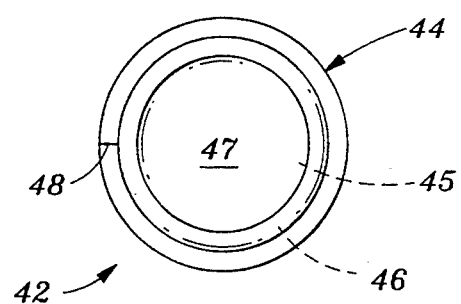
Fig. 4     Fig. 5
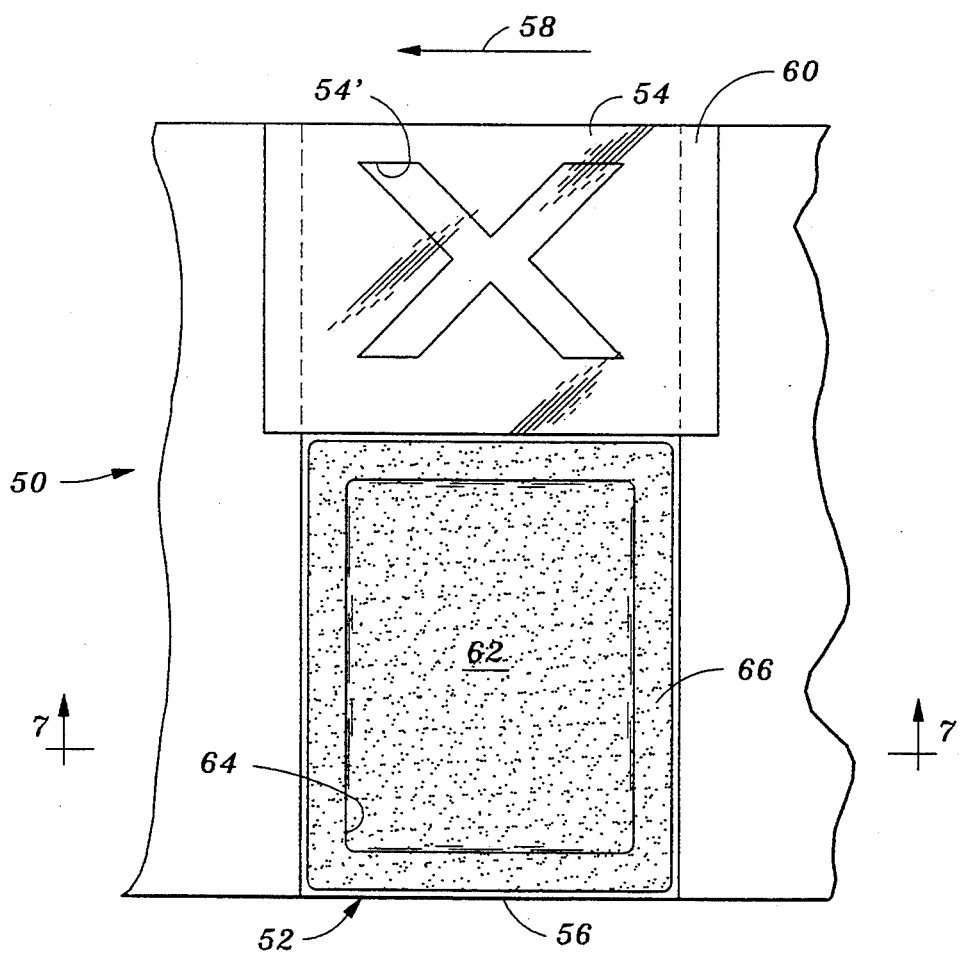
Fig. 6
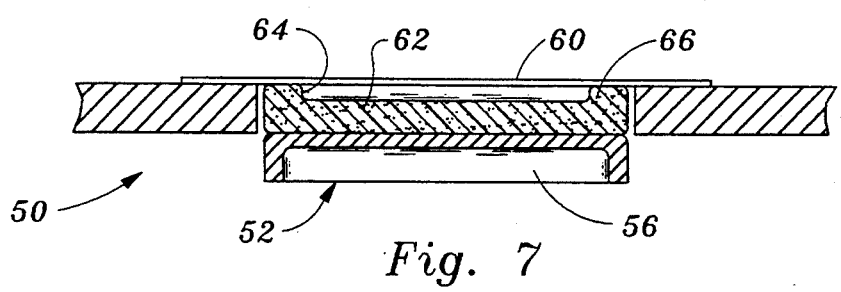
Fig. 7

MERCHANDISE DAMPER AND PROTECTOR FOR WEIGHING SCALES

This is a continuation of application Ser. No. 07/774,043, filed on Oct. 7, 1991, U.S. Pat. No. 5,195,599 which is a continuation-in-part of application Ser. No. 07/640,270 filed Jan. 11, 1991 now abandoned.

BACKGROUND OF THE INVENTION

1. Field of the Invention

My present invention relates to weighing scales, and more particularly to mercantile electronic weighing scales and the merchandise receiving platforms thereof.

2. Description of the Prior Art

It is known in the prior art to provide the platforms of personal weighing scales, which are contacted by human body parts, with permanent coverings of linoleum or similar substances. A personal weighing scale provided with such a permanent covering is shown and decribed in U.S. Pat. No. 1,893,041, issued to Fred A. Schmitz on Jan. 3, 1933.

It is also known in the prior art to provide a top-loading precision balance with a two-part pan assembly, which pan assembly includes a unitary sheet metal cover spacedly superposed on a base. Such a precision balance is shown and described in U.S. Pat. No. 4,155,412, issued to Luchinger and Strickler on May 22, 1979.

It is also known in the prior art to provide the platform of an industrial weighing scale with an overlying thin sheet of rubber or similar material which itself bears a rigid load-receiving platter, said platter being provided with skirts which protect the mechanism of the weighing apparatus from exposure to liquids. A water-resistant weighing apparatus of this type is shown and described in U.S. Pat. No. 4,526,246, issued to Stephen A. Patoray on Jul. 2, 1985.

It is also known in the prior art to superpose upon the platform of an electromagnetic balance a rigid shield formed from ferromagnetic material of sufficiently high permeability to provide a path of least reluctance for transmitting flux from an external field, thereby preventing such flux from interfering with the intended operation of the weighing apparatus. An electromagnetic balance of this type is shown and described in U.S. Pat. No. 4,878,552, issued to Charles H. Gebo and Bradley C. Roth on Nov. 7, 1989.

A copy of each of the above-listed patents is supplied to the Patent and Trademark Office herewith.

No representation or admission is made that any of the above-listed patents is part of the prior art, or that no more pertinent information exists.

The term "prior art" as used herein or in any statement made by or on behalf of applicant means only that any document or thing referred to as prior art bears, directly or inferentially, a date which is earlier than the effective filing date hereof.

None of the prior art patents discussed hereinabove shows or describes the application to a weighing scale platform of a cover which is easily impressible or indentable, yielding, spongy, or pillow-like.

None of the prior art patents discussed hereinabove shows or describes a cover for a scale platform which is expendable, i.e., is so subject to being ruptured by items commonly abruptly placed thereupon that its effective life is very brief compared with the life of the scale.

Further, none of the above-discussed prior art patents shows or describes a temporary cover which is to be applied to the platform of a mercantile scale.

Yet further, none of the above-discussed prior art patents shows or describes a cover for the platform of a mercantile weighing scale which is sufficiently light in weight so that it falls within the zero adjustment range of many if not most mercantile weighing scales, whereby such scales need only be adjusted, and not modified, in response to the application thereto of such a platform cover.

It is also known in the prior art that certain irregularly shaped articles of merchandise, when abruptly placed upon the rigid, unyielding surfaces of the platforms of electronic mercantile scales, tend to rock repeatedly, thereby preventing the scale reading from settling immediately to a final value. This problem will hereinafter be called the "settling problem".

It is also known in the prior art that certain articles of merchandise, such as truffles or other candy or confectionery items, can be damaged by being abruptly deposited upon the rigid, unyielding platforms of conventional mercantile scales.

It is yet further known in the prior art that certain articles of merchandise can at times roll off the flat, rigid, unyielding surfaces of the platforms of mercantile electronic scales upon which they are abruptly placed, thus rendering them unmerchantable.

SUMMARY OF THE INVENTION

Accordingly, it is an object of my invention to provide covers for the platforms of electronic mercantile scales which eliminate or substantially reduce the above-described settling problem.

Another object of my invention is to provide covers for the platforms of electronic mercantile scales which reduce the incidence of damage to articles of merchandise abruptly placed thereon in the ordinary course of retail transactions, especially during rush hours.

A further object of my invention is to provide covers for the platforms of electronic mercantile weighing scales which prevent articles of merchandise from rolling off those platforms and thereby being damaged or otherwise rendered unmerchantable.

Yet another object of my present invention is to provide covers for the platforms of electronic mercantile weighing scales which protect and cushion articles of merchandise abruptly placed thereupon and yet at the same time are capable of being as easily and thoroughly cleaned as the rigid, unyielding platforms of conventional electronic mercantile weighing scales.

A still further object of my present invention is to provide covers for the platforms of electronic mercantile weighing scales which protect weighed merchandise and eliminate or reduce the settling problem, and yet are so light in weight that their installation upon the platforms of an electronic mercantile weighing scales requires only that the scale be re-zeroed in the known manner, and does not require that the scale be modified in any way.

A yet further object of my invention is to provide covers for the platforms of electronic mercantile weighing scales which are sufficiently inexpensive so that they can be regularly replaced for cleanliness, in response to wear, and in order to change advertising or other messages thereupon which are viewable by the purchaser of the weighed articles.

Other objects of my invention will in part be obvious and will in part appear hereinafter.

My invention, accordingly, comprises the several steps and the relation of one or more of such steps with respect to each of the others, and the apparatus embodying features of construction, combinations of elements, and arrangements of parts which are adapted to effect such steps, all as exemplified in the following disclosure, and the scope of my invention will be indicated in the claims appended hereto.

In accordance with a principal feature of my invention a cover is provided for the platform of a weighing scale, which cover is comprised of at least one elongated body of resilient foam material.

In accordance with another principal feature of my invention said cover is comprised of a plurality of elongated bodies of resilient foam material.

In accordance with another principal feature of my invention said cover further comprises at least one body of adhesive material whereby said cover may be removably adhered to said platform.

In accordance with a further principal feature of my invention a cover for the platform of a weighing scale is comprised of at least one elongated body of resilient foam material, and said at least one elongated body of resilient foam material is contained in an envelope of thin, flexible membranous material, such as one of the well known transparent plastic materials widely used for packaging, roofing, etc.

In accordance with a still further principal feature of my invention said thin, flexible membranous material is fluid impervious, and thus said cover can be easily cleaned while affixed to said scale platform without introducing fluid into the body or bodies of resilient foam material contained within said envelope.

In accordance with another principal feature of my invention said body or bodies of resilient foam material are close-fittingly contained within said envelope, whereby said cover presents a substantially flat, smooth surface which is easily cleanable while said cover is secured in place on said platform.

In accordance with an additional principal feature of my invention the walls of said envelope are formed from air-impermeable material, the continuous joint between the outer edges of said walls is itself air-impermeable, and a venting passage extends from the interior to the exterior of said envelope, said venting passage being sufficiently large to permit said envelope to readily collapse in response to the weight of an article of merchandise placed upon said cover.

In accordance with another principal feature of my invention one or more bodies of adhesive material are applied to the lower wall of said envelope whereby said envelope may be adhered to the platform of a weighing scale.

In accordance with a further principal feature of my invention a scale platform cover of my invention is comprised of a plurality of elongated bodies of resilient foam material, the upper one of these bodies of resilient foam material is provided with a central opening defining a merchandise receiving depression, and the wall of the envelope confronting this merchandise receiving depression is shaped to conform of the walls of this merchandise receiving depression, and to lie on the bottom thereof.

For a fuller understanding of the nature and objects of my invention, reference should be had to the following detailed description, taken in connection with the accompanying drawings.

BRIEF DESCRIPTION OF THE DRAWINGS

FIG. 4 is a plan view of the scale platform cover of the second preferred embodiment of my invention;

FIG. 5 is a plan view of a scale platform cover of another embodiment of my invention;

FIG. 6 is a partial plan view of a grocery store check-out counter in which is inset a combined weighing scale and barcode reader, the platform of which weighing scale is covered with a scale platform cover of an alternative embodiment of my invention;

FIG. 7 is a cross-sectional view in elevation taken on plane 7—7 of FIG. 6;

DESCRIPTION OF THE PREFERRED EMBODIMENTS

Figure 1:
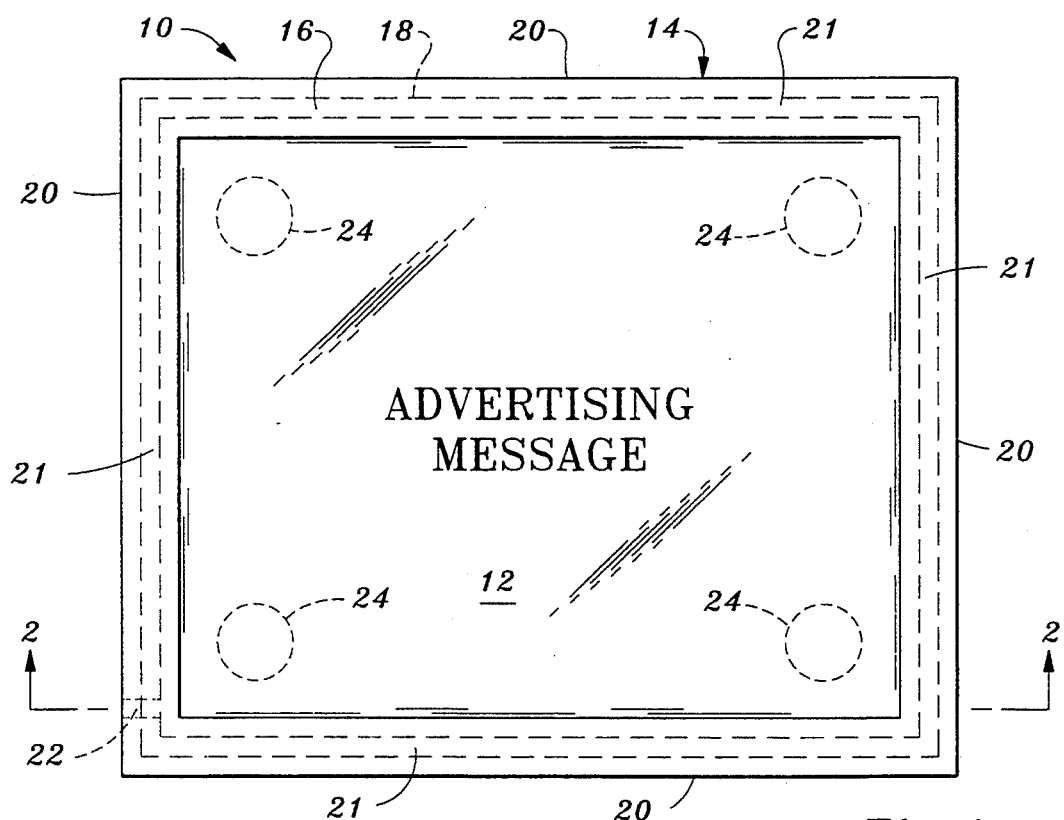
FIG. 1 is a plan view of the scale platform cover of the first preferred embodiment of my invention.
Figure 2:
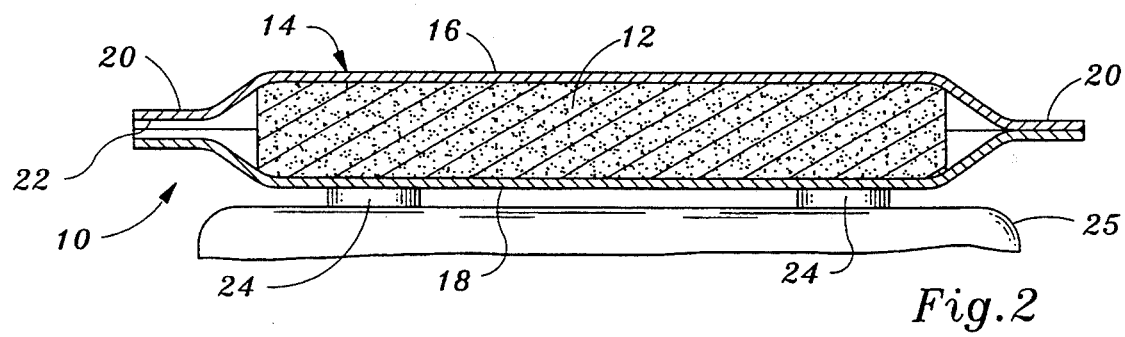
FIG. 2 is a vertical sectional view of the scale platform cover of my invention shown in FIG. 1, taken on plane 2—2 of FIG. 1.

Referring now to FIGS. 1 and 2, there is shown a merchandise damping and protecting cover 10 for the platform of a weighing scale, constructed in accordance with the first preferred embodiment of my invention.

As may be seen by comparison of FIGS. 1 and 2, merchandise damping and protecting scale platform cover 10 is comprised of a body 12 of resilient foam material, sometimes called the "core" herein.

While the core 12 of scale platform cover 10 of the first preferred embodiment of my invention consists of a single body of resilient foam material, it is to be understood that in other embodiments of my invention the core may be comprised of a plurality of bodies of resilient foam material, not all of which are of the same size or configuration.

As best seen in FIG. 2, core 12 of scale platform cover 10 is contained within a close-fitting envelope 14 of thin, flexible membranous material.

The thin, flexible membranous material of envelope 14 is selected for its resistance to impact by the sharp edges of food-containing metal cans and the like, and for its resistance to abrasion and easily cleanability.

Thus, the thin, flexible membranous material of envelope 14 may be one of the well known transparent plastic sheet materials which are widely used for the packaging of heavy items, for roofing, etc.

In the first preferred embodiment of my invention envelope 14 is comprised of an upper panel or wall 16 of thin, flexible membranous material and a lower panel or wall 18 of the same thin, flexible membranous material; panels 16 and 18 being sealed together along their outer edges 20, as by heat sealing in the well known manner. As seen in FIG. 1, heat-sealed seam 21 is continuous over the entire periphery of cover 10.

In accordance with one of the teachings of my invention, at least the upper panel 16 of envelope 14 is fabricated from transparent material, and an advertising message is silkscreen printed or otherwise deposited on the lower face thereof, immediately adjacent core 12, whereby to protect this advertising message from defacement by articles of merchandise abruptly placed on or scraped over the upper surface of wall 16. The advertising message may also be imprinted on a plastic sheet placed on top of core 12.

As may also be seen by comparison of FIGS. 1 and 2, a venting passageway 22 is provided which communicates between the space within envelope 14 and the space outside envelope 14.

The lumen of venting passage 22 is sufficiently large so that air may readily and rapidly escape from envelope 14 in response to the abrupt placing of articles of merchandise on upper wall 16, thereby permitting a depression to immediately form under each article of merchandise deposited upon upper wall 16 of scale platform cover 10. As will be evident to those having ordinary skill in the art, informed by the present disclosure, the formation of such a local depression beneath each article of merchandise deposited upon upper wall 16 of scale platform cover 10 immediately damps any rocking of irregularly shaped articles of merchandise, which rocking might take place if the same irregularly shaped article of merchandise were abruptly placed upon the rigid, unyielding surface of the scale platform 25 (FIG. 2) unprovided with scale platform cover 10.

By thus damping the repeated rocking motion of irregularly shaped objects, scale platform cover 10 of the first preferred embodiment of my invention eliminates or reduces the "settling problem", i.e., causes the reading on the scale of which platform 25 is a part to settle to its final reading very rapidly.

As best seen in FIG. 2, core 12 of resilient foam material, which is sealed within envelope 14, serves to hold the upper and lower panels 16 and 18 apart, except when merchandise or some other thing is disposed upon the outer face of upper panel 16, scale platform cover 10 being disposed upon the platform 25 of a weighing scale as shown in FIG. 2.

As may be seen by comparison of FIGS. 1 and 2, a plurality of adhesive disks 24 are adhered to the outer face of lower panel or wall 18. Adhesive disks 24 are provided for the purpose of adhering the merchandise damping and protecting scale platform cover 10 of the first preferred embodiment of my invention to scale platform 25 (FIG. 2).

Adhesive disks 24 may be of the double-sided or "double-stick" variety, and the outer faces thereof may be temporarily covered with a protective layer or sheet in the wall known manner.

As best seen in FIG. 1, upper panel 16 may be provided with an advertising message which is readily viewable by those standing near the weighing scale to the platform of which cover 10 is adhered by adhesive disks 24. It is to be understood, however, that my invention is not limited to scale platform covers of the kind wherein the advertising message is viewable through a transparent upper panel. Rather, my invention embraces both embodiments in which the advertising message is located within the inner face of the upper wall of the envelope and embodiments in which the advertising message is imprinted on the upper face of the upper wall of the envelope.

Operation

Assuming that the merchandise damping and protecting scale platform cover 10 of my invention has been adhered to the platform 25 of a weighing scale, and that that weighing scale has been readjusted to its zero reading, the principles of my invention will now be described.

It will be understood by those having ordinary skill in the art, informed by the present disclosure, then, that when an item of merchandise is abruptly placed on platform cover 10 it locally depresses panel 16 into foam body 12, thereby damping any tendency of that item of merchandise to rock or roll across the surface of scale platform 25, whereby the complete settling of that item of merchandise on platform 25 is rendered very rapid, causing the reading of the weighing scale, even if it be an electronic scale, to settle to a final value very rapidly.

At the same time, as will be evident to those having ordinary skill in the art, informed by the present disclosure, platform cover 10 also tends to protect certain items of merchandise, such as produce, chocolates, etc., from being bruised or otherwise damaged by impact upon scale platform 25.

It will further be evident to those having ordinary skill in the art, informed by the present disclosure, that when once an item of merchandise has been removed from platform cover 10, foam body 12 very quickly restores the level upper surface of panel 16.

Further, envelope 14, and more particularly upper wall 16 thereof, protects resilient foam body 12 from being torn by the impact of sharp-edged items of merchandise.

Figure 3:
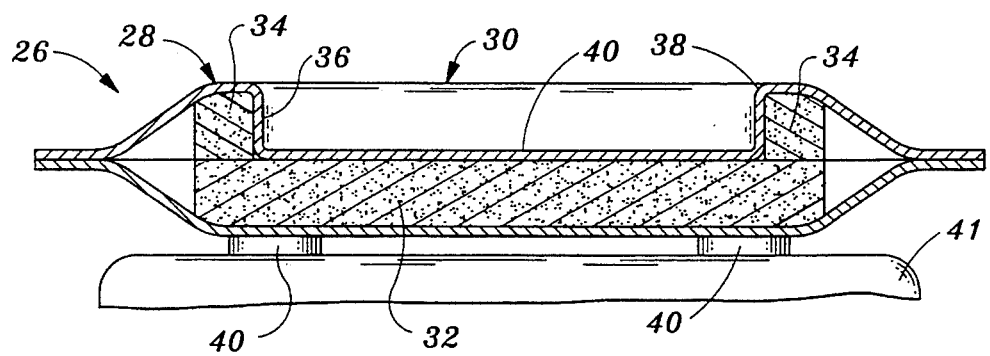
FIG. 3 is a vertical sectional view of a scale platform cover of the second preferred embodiment of my invention.

Referring now to FIGS. 3 and 4, there is shown a second preferred embodiment of my invention which is particularly useful with weighing scales having platforms of limited area.

Merchandise damping and protecting scale platform cover 26 of the second preferred embodiment of my invention, as shown in FIGS. 3 and 4, is comprised of an envelope 28 similar in construction to envelope 14 of the first preferred embodiment of my invention except as particularly pointed out hereinafter.

It is a particular feature of the second preferred embodiment of my invention, as distinct from the fist preferred embodiment of my invention, that the upper surface of scale platform cover 26 is provided with a shallow pocket 30 in its upper surface.

As seen in FIG. 4, shallow pocket 30 occupies a very substantial part of the upper surface of scale platform cover 26.

As seen in FIG. 3, the resilient foam material core of scale platform cover 26 is comprised of two resilient foam material elements 32, 34.

In order to define pocket 30, resilient foam material element 32 is a continuous body of resilient foam material, similar to resilient foam material body 12 of the first preferred embodiment but somewhat thinner, and resilient foam material element 34 is a frame-like body of resilient foam material having a central opening 36 which defines pocket 30.

As also seen in FIG. 3, the upper panel 38 of envelope 28 is provided, as by thermal deformation, with an inwardly depending portion having a lower surface 40 which in operation rests upon the upper surface of resilient foam material element 32.

As also seen in FIG. 3, envelope 28 is provided with a plurality of adhesive disks 40 substantially similar to adhesive disks 24 of the first preferred embodiment, whereby scale platform cover 26 may be adhered to the platform 41 of a weighing scale.

It is also to be understood that envelope 28 is provided with a vent similar to vent 22 of the first preferred embodiment, and that an advertising message may suitably be printed upon the bottom panel 40 of pocket 30. It is to be understood that if the bottom panel 40 of pocket 30 is transparent, said advertising message may be imprinted upon the lower surface thereof, to avoid defacement of the advertising message by the frequent contact of items of merchandise with the upper face of panel 40.

While, as seen in FIGS. 1 and 4, the merchandise damping and protecting weighing scale platform cover of either preferred embodiment may be of rectangular cross-section, it is to be understood that my invention is not limited to any particular configuration of the scale platform cover thereof, but rather may also include scale platform covers of circular configuration, of ellipsoidal configuration, etc.

Referring to FIG. 5, then, there is shown a scale platform cover 42 of my invention in which the envelope 44 is of circular configuration.

As will be understood by those having ordinary skill in the art, informed by the present disclosure, envelope 44 is substantially similar in construction to envelope 28 of the second preferred embodiment, except that envelope 44 is of circular configuration.

The core of scale platform cover 42 is comprised of two elements 45, 46 fabricated from resilient foam material.

Resilient foam material element 45 is a circular disk of resilient foam material, and resilient foam material element 46 is a toroidal body of resilient foam material. Elements 45 and 46 together define a shallow pocket 47, similar to pocket 30.

Envelope 44 is provided with a venting passage 48 substantially similar to venting passage 22, and to the venting passage of envelope 26.

Referring now to FIG. 6, and comparing the same with FIG. 7, there is shown a typical grocery store checkout counter 50 in which is inset a typical combined weighing scale and barcode reader 52 of the kind sometimes called a "scanning scale".

As will be understood by those having ordinary skill in the art, the barcode portion 54 of scanning scale 52 is shown only schematically (FIG. 6), and only the platform portion 56 of the weighing scale mechanism of scanning scale 52 is shown in FIGS. 6 and 7.

In the well known manner, the barcode reader 54 Includes an X-shaped window 54'.

The direction of merchandise flow is indicated by arrow 58.

In the known manner, a glass plate 60 is affixed to counter 50, and overlies bar code reader 54. In accordance with well known practice, recesses may be provided in counter 50 to receive the opposite ends of glass plate 60.

As may also be seen by comparison of FIGS. 6 and 7, a scale platform cover 62 of my invention is disposed upon scale platform 56, and covers substantially the entire top face thereof.

As seen in FIG. 7, scale 52 is recessed in counter 50 to such an extent that when scale platform cover 62 is disposed upon scale platform 56 the upper edge of scale platform cover 62 is flush with the surface of counter 50.

In accordance with the principles of my invention, the upper face of scale platform cover 26 is provided with a depression 64. That is to say, depression 64 may be thought of as being defined by a rib or ridge. 66 projecting upwardly from the body of scale platform cover 62 throughout the periphery of scale platform cover 62.

As will be obvious to those having ordinary skill in the art, informed by the present disclosure, scale platform cover 62 is of the type in which the separate envelope of the earlier-described embodiments is replaced by a more or less gas impervious coating which is applied directly to the resilient foam material core.

It is to be understood that in certain embodiments of my invention this coating may be replaced by an outer skin which is formed integrally with the resilient foam material of the core by thermally fusing the surface of the core. As taught herein in connection with other embodiments of my invention, the coating or skin may in some embodiments cover only a part of the outer surface of the core, whereby venting is provided.

Figure 8:
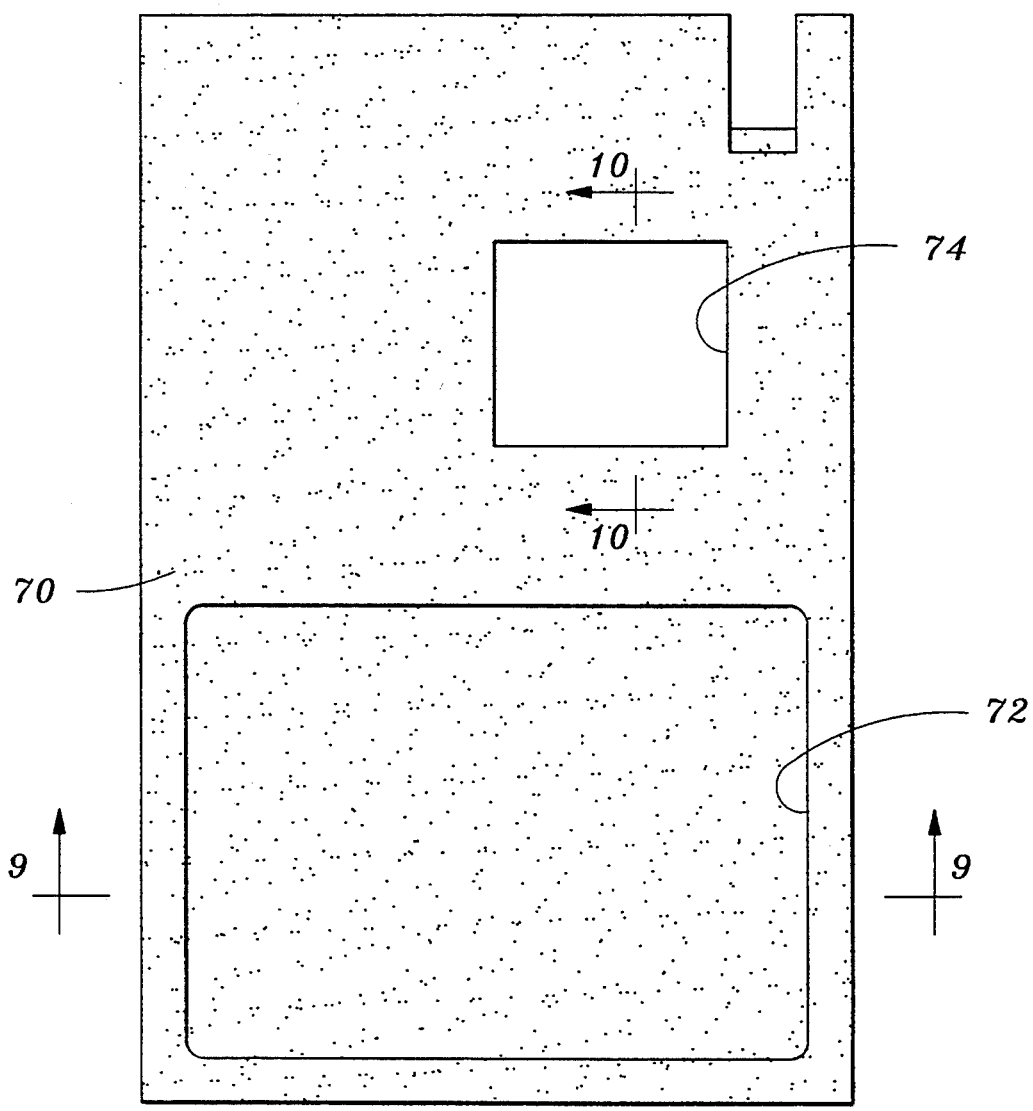
FIG. 8 is a plan view of a merchandise damping and protecting scale platform cover constructed in accordance with yet another embodiment of my invention.
Figure 9:
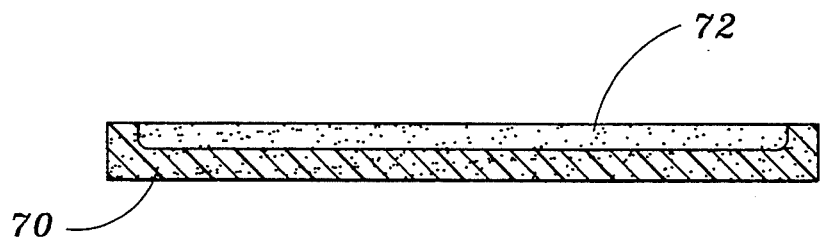
FIG. 9 is a cross-sectional view in elevation of the merchandise damping and protecting scale platform cover of FIG. 8, taken on plane 9—9 of FIG. 8.
Figure 10:
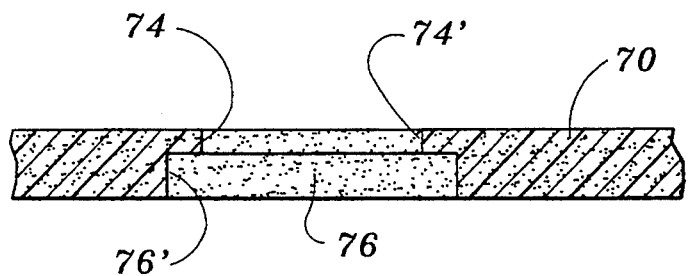
FIG. 10 is a partial cross-sectional view in elevation of the merchandise damping and protecting scale platform cover of FIG. 8, taken on plane 10—10 of FIG. 8.

Referring now to FIGS. 8 through 10, there is shown a scale platform cover 70 of a particular preferred embodiment of my invention, adapted for use with an IBM Series 4680 Scanning Scale. Such a scanning scale is generally shown in U.S. Pat. No. 4,794,240.

The major dimensions of cover 70 are substantially equal to the dimensions of the top of said IBM Scanning Scale, and the material of the core of cover 70 is a resilient foam material of the kind used in constructing the scale platform covers of other embodiments of my invention shown and described herein.

Cover 70, like the above-described cover 62, is provided with a coating or thermal skin, rather than a separate envelope.

Comparing FIGS. 8 and 9, it will be seen that cover 70 is provided with a recess or depression 72 similar to recess or depression 64 shown in FIGS. 6 and 7 except for its shape, size, and location on cover 70.

As seen in FIG. 8, cover 70 is also provided with a window 74 which extends completely through cover 70. Window 74 is so located and of such size as to register with the scanning window of the IBM 4680 Series Scanning Scale with which it is to be used.

Referring now to FIG. 10, it will be seen that a recess 76 is provided in the lower surface of cover. 70. Recess 76 extends completely around window 74 and its outer wall 76' is everywhere equidistant from the periphery 74' of window 74.

Figure 11:
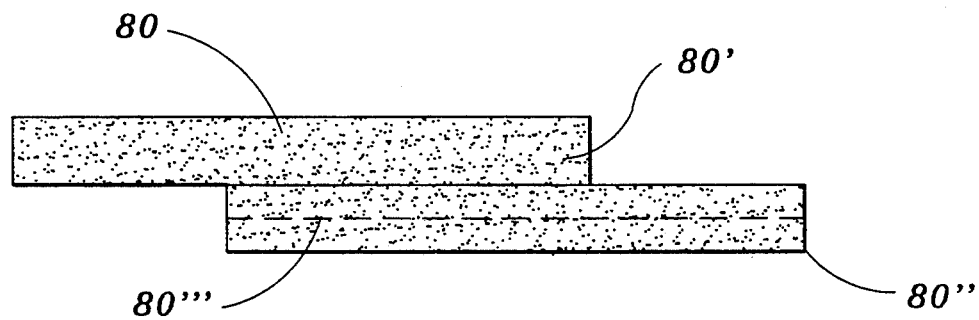
FIG. 11 is an elevational view of a window insert adapted to cooperate with the scale platform cover of FIG. 8 in adapting it for use with a particular commercial scanning scale.
Figure 12:
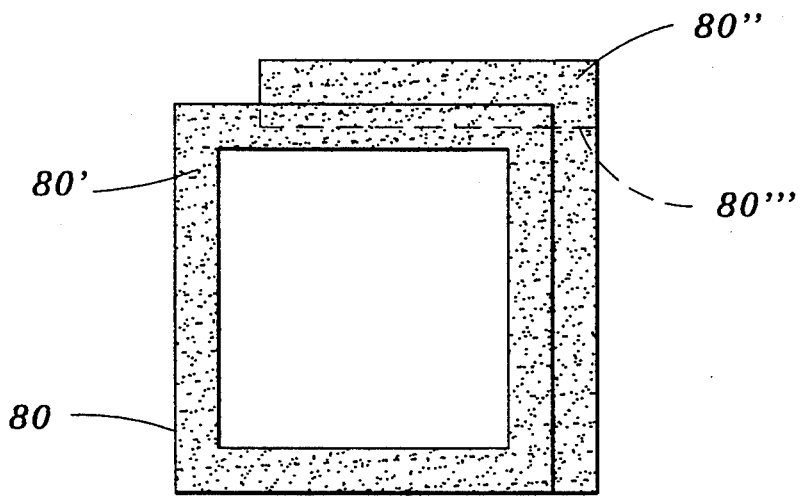
FIG. 12 is an elevational view of the window insert of FIG. 11.

Referring now to FIGS. 11 and 12, there is shown an insert 80 which is adapted to cooperate with cover 70, whereby to better adapt cover 70 to coact with certain embodiments of said IBM Scanning Scale.

Window insert 80 is preferably formed from a single body of resilient foam material of the same kind as the foam material of cover 70, and is coated or provided with a suitable thermal skin.

As may be seen by comparison of FIGS. 11 and 120 window insert 80 may be thought of as being comprised of a main body portion 80' and a flange portion 80". Flange portion 80" is substantially continuous, as shown in FIGS. 11 and 12, but one edge thereof is suitably recessed to accommodate a portion of the abovesaid IBM Scanning Scale, as will be obvious to those having ordinary skill in the art who are familiar with that scanning scale.

A glass plate is preferably disposed between cover 20 and insert 80.

As will be seen by comparison of FIGS. 11 and 12, recessed portion 80''' of window insert 80 defines a rear flange portion which is narrower or less thick than the remainder of flange 80'''.

It will now be understood by those having ordinary skill in the art, informed by the present disclosure, that all embodiments of the scale platform cover of my invention, of whatever configuration, serve to damp the motion of merchandise items abruptly placed thereupon, and thus to cause the readings of the scales equipped therewith to settle quickly, and also to protect such merchandise items from bruising or other damage by contact with the scale platform.

Thus, for example, another embodiment of my invention may be provided in which all or a part of the envelope is replaced by a more or less gas impervious coating which is applied to the foam core. This coating will preferably be highly tear-resistant and impact-resistant, as compared with the foam of the core, and may be imprinted with any desired advertising message.

In one particular variant of this embodiment of my invention the foam core may be thus coated throughout its entire surface, as is the case with certain well known toys.

In the event that the selected coating is not substantially gas pervious it may be found desirable to provide the coating itself with a considerable number of venting holes, preferably located along the edges of the scale pan cover of this embodiment, whereby to maximize the damping effect of the scale pan cover of this embodiment.

In yet another alternative embodiment of my invention the foam core material may be replaced with one or more layers of bubble pack material, i.e., plastic sheet material of the kind wherein a plurality of gas-containing bubbles are raised upon the surface of plastic sheeting, in the well known manner. In a variant of this alternative embodiment of my invention the bubble pack material may be of the kind wherein the bubbles are not located immediately adjacent each other but are interspaced by areas of unraised web which are greater than the areas of the bubbles themselves.

In a particular variant of this alternative embodiment of my invention the face of the bubble pack material opposite the bubbles may serve as one or both of the envelope walls, and a suitable advertising message may be imprinted upon said face opposite the bubbles.

In another particular variant of this embodiment of my invention the bubble pack material may be sufficiently rigid so that the bubbles are not deformed by their own weight and the weight of the overlying sheet, and each bubble may be perforated, said perforations being vented into a common air space which is itself vented to the ambient atmosphere outside the envelope.

It will thus be seen that the objects set forth above, among those made apparent from the preceding description, are efficiently attained, and since certain changes may be made in the above constructions and the method carried out thereby without departing from the scope of my invention, it is intended that all matter contained in the above description or shown in the accompanying drawing shall be interpreted as illustrative only, and not in a limiting sense.

It is also to be understood that the following claims are intended to cover all of the generic and specific features of my invention as hereindescribed, and all statements of the scope of my invention which, as a matter of language, might be said to fall therebetween.

What is claimed is:

1. A combination comprising:
   a weighing scale having a receiving member for receiving things to be weighed, which receiving member is provided with a rigid, unyielding upper surface, indicating means for indicating the weight of things disposed upon said receiving member, and zero adjustment means whereby the weight indicated by said indicating means may be adjusted over a predetermined zero adjustment range to bring the indication on said indicating means to zero; and
   a temporary, expendable cushioning cover of predetermined weight disposed upon said receiving member, said cushioning cover being comprised of resilient foam material, being immediately removable from said receiving member without tools, and having a first side and a second side opposed thereto;
   said predetermined weight of said cushioning cover being less than said zero adjustment range, whereby the weight reading indicated by said indicating means may be adjusted to zero when said cushioning cover is disposed upon said receiving member without modifying any part of said weighing scale.

2. The combination claimed in claim 1 wherein said cushioning cover is provided with a depression in said first side.

3. The combination claimed in claim 1 wherein said cushion cover is unattached to said receiving member.

4. The combination claimed in claim 1 wherein said cushioning cover is attached to said receiving member by hook-and-loop fastener means.

5. The combination claimed in claim 2 wherein said cushioning cover is unattached to said receiving member.

6. The combination claimed in claim 2 wherein said cushioning cover is attached to said receiving member by hook-and-loop fastener means.

7. The combination claimed in claim 1 wherein an aperture extends completely through said cushioning cover, said aperture being so located in said cushioning cover as to be juxtaposed to a bar code scanning window which is located in said receiving member.

8. The combination claimed in claim 2 wherein an aperture extends completely through said cushioning cover, said aperture being so located in said cushioning cover as to be juxtaposed to a bar code scanning window which is located in said receiving member.

* * * * *